(12) United States Patent
Steltz

(10) Patent No.: US 11,585,365 B2
(45) Date of Patent: Feb. 21, 2023

(54) TRIM CLIP WITH FOUR POINT RETENTION

(71) Applicant: Illinois Tool Works Inc., Glenview, IL (US)

(72) Inventor: Jeffrey J. Steltz, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/931,954

(22) Filed: May 14, 2020

(65) Prior Publication Data

US 2020/0400180 A1    Dec. 24, 2020

Related U.S. Application Data

(60) Provisional application No. 62/865,391, filed on Jun. 24, 2019.

(51) Int. Cl.
| | | |
|---|---|---|
| *F16B 21/07* | (2006.01) | |
| *F16B 5/06* | (2006.01) | |
| *B60R 13/02* | (2006.01) | |

(52) U.S. Cl.
CPC ........ *F16B 21/073* (2013.01); *B60R 13/0206* (2013.01); *F16B 5/0621* (2013.01)

(58) Field of Classification Search
CPC .. B60R 13/0206; F16B 21/073; F16B 21/075; F16B 5/0621; F16B 5/0657
See application file for complete search history.

(56) References Cited

U.S. PATENT DOCUMENTS

| | | | |
|---|---|---|---|
| 5,193,961 A * | 3/1993 | Hoyle | F16B 21/075 24/297 |
| 5,533,237 A | 7/1996 | Higgins | |
| 5,542,158 A * | 8/1996 | Gronau | F16B 5/0657 24/297 |
| 5,704,749 A * | 1/1998 | Landgrebe | F16B 5/025 411/386 |
| 6,279,207 B1 * | 8/2001 | Vassiliou | F16B 5/0635 24/295 |
| 6,691,380 B2 * | 2/2004 | Vassiliou | F16B 5/0614 24/295 |
| 6,796,006 B2 | 9/2004 | Hansen | |
| 7,204,000 B2 * | 4/2007 | Benedetti | F16B 5/123 24/297 |
| 7,287,945 B2 * | 10/2007 | Lubera | F16B 5/0664 24/295 |
| 7,401,388 B2 | 7/2008 | Hansen | |
| 8,056,193 B2 | 11/2011 | Park | |

(Continued)

FOREIGN PATENT DOCUMENTS

| | | |
|---|---|---|
| CN | 110939635 A | 3/2020 |
| CN | 210371479 U | 4/2020 |

(Continued)

OTHER PUBLICATIONS

European Search Report for European Patent Application No. 20178522.7, dated Nov. 13, 2020 (8 pages).

*Primary Examiner* — David M Upchurch
(74) *Attorney, Agent, or Firm* — Quarles & Brady LLP

(57) ABSTRACT

A fastener includes a grommet and a pin. The grommet has a bottom set of lead in features. The pin is configured to removably snapably engage the grommet. The pin has a lead in feature.

25 Claims, 8 Drawing Sheets

(56) References Cited

U.S. PATENT DOCUMENTS

| | | | | |
|---|---|---|---|---|
| 8,567,017 B2* | 10/2013 | Iwahara | ............ | F16B 5/065 296/72 |
| 8,683,662 B2 | 4/2014 | Cooley et al. | | |
| 9,303,665 B2* | 4/2016 | Steltz | ............ | F16B 5/0657 |
| D759,476 S* | 6/2016 | Iwahara | ............ | D8/395 |
| 2006/0005363 A1* | 1/2006 | Reiter | ............ | A44B 17/0017 24/459 |
| 2007/0003390 A1* | 1/2007 | Kawai | ............ | F16B 19/1081 411/48 |
| 2008/0260488 A1* | 10/2008 | Scroggie | ............ | F16B 5/0657 411/509 |
| 2010/0088860 A1* | 4/2010 | Benedetti | ............ | F16B 21/088 24/297 |
| 2011/0314646 A1* | 12/2011 | Ribes | ............ | F16B 2/241 24/530 |
| 2012/0155985 A1* | 6/2012 | Ruckel | ............ | F16B 37/043 411/301 |
| 2014/0086704 A1* | 3/2014 | Hemingway | ............ | B33Y 50/02 411/378 |
| 2015/0173466 A1* | 6/2015 | Shimizu | ............ | F16B 21/075 24/598.1 |
| 2015/0321622 A1* | 11/2015 | Dickinson | ............ | F16B 5/065 24/458 |
| 2016/0016522 A1* | 1/2016 | Smith | ............ | F16B 37/043 296/35.1 |
| 2016/0138629 A1* | 5/2016 | Flynn | ............ | F16B 13/063 411/57.1 |
| 2016/0258465 A1 | 9/2016 | Heimann et al. | | |
| 2017/0113629 A1* | 4/2017 | Dickinson | ............ | B60R 13/0206 |
| 2017/0113632 A1* | 4/2017 | Dickinson | ............ | F16B 2/24 |

FOREIGN PATENT DOCUMENTS

| | | |
|---|---|---|
| EP | 3696428 A1 | 8/2020 |
| EP | 3779215 A1 | 2/2021 |
| EP | 3779216 A1 | 2/2021 |
| GB | 1571958 A | 7/1980 |
| IT | TO20090321 A1 | 10/2010 |
| JP | S5886912 U | 6/1983 |
| JP | H0651518 U | 7/1994 |
| JP | H0814231 A | 1/1996 |
| JP | 2003072599 A | 3/2003 |
| WO | 2018080610 A1 | 5/2018 |
| WO | 2019040301 A1 | 2/2019 |

* cited by examiner

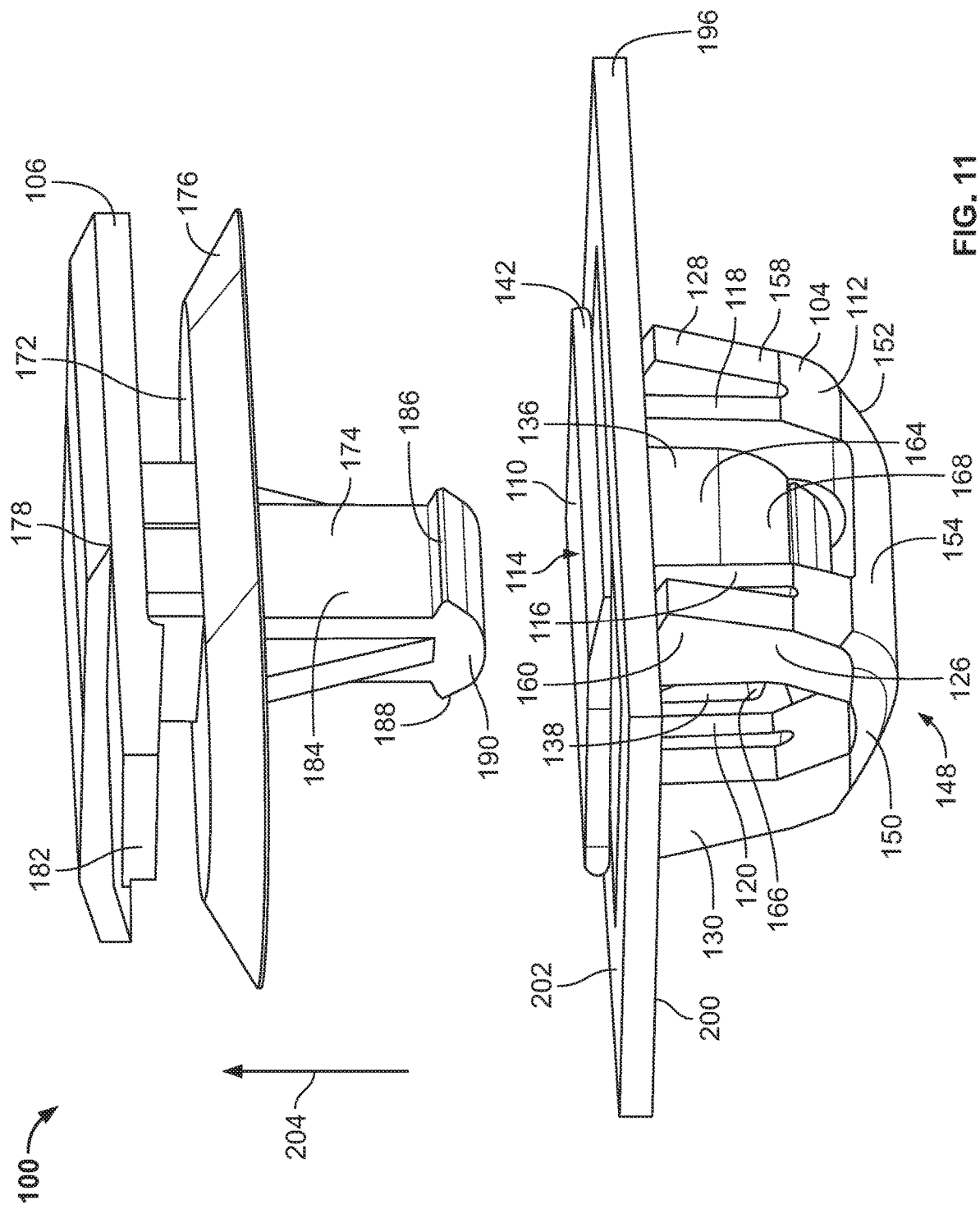

TRIM CLIP WITH FOUR POINT RETENTION

RELATED APPLICATIONS

The present application claims priority to U.S. Provisional Application Ser. No. 62/865,391 filed on Jun. 24, 2019, which is incorporated by reference in its entirety herein.

FIELD OF THE DISCLOSURE

Embodiments of the present disclosure generally relate to fasteners, and, more particularly, to a trim clip with four point retention.

BACKGROUND

In recent years, fasteners have been developed to secure panels to one another. For example, vehicles include interior panels attached to body panels via a fastener inserted through respective slots in the panels. These fasteners permit the panels to be assembled together quickly.

Certain known fasteners use a grommet with two retention points and a corresponding pin. In some instances, the grommet attaches to a body panel and the pin is inserted through an interior panel and received by the grommet (e.g., to attach an interior portion to a vehicle door). However, the known grommets have little retention redundancy and are often difficult to install in the body panels. Further, the known pins are often difficult to install in the grommets and are difficult to remove from the grommets during service (e.g., to service a power window assembly).

Therefore, a need exists for a fastener that is strongly retained in a body panel, is simple to install, and permits relatively easy separation of panels.

SUMMARY

In one aspect, an example fastener includes a grommet and a pin. The grommet has a bottom set of lead in features. The pin is configured to removably snapably engage the grommet. The pin has a lead in feature.

In another aspect, an example fastener includes a grommet and a pin. The grommet has a rounded bottom plate. The pin has a rounded stem configured to removably engage the grommet.

In another aspect, an example fastener, includes a grommet and a pin. The grommet includes a top plate, a bottom plate, a plurality of tapered prongs, and a plurality of retention fingers. The bottom plate is connected to the top plate and has a bottom set of lead in features. The plurality of tapered prongs is resiliently pivotably connected to the bottom plate and extends toward the top plate. The plurality of retention fingers is resiliently pivotably connected to the top plate and extends toward the bottom plate. The pin is configured to removably snapably engage the plurality of retention fingers.

BRIEF DESCRIPTION OF THE DRAWINGS

FIG. 11 is an isometric view of the pin of FIGS. 4 and 6 being removed from the grommet of FIGS. 5 and 7 while the grommet remains installed in the panel of FIGS. 8, 9, and 10.

Figure 1:
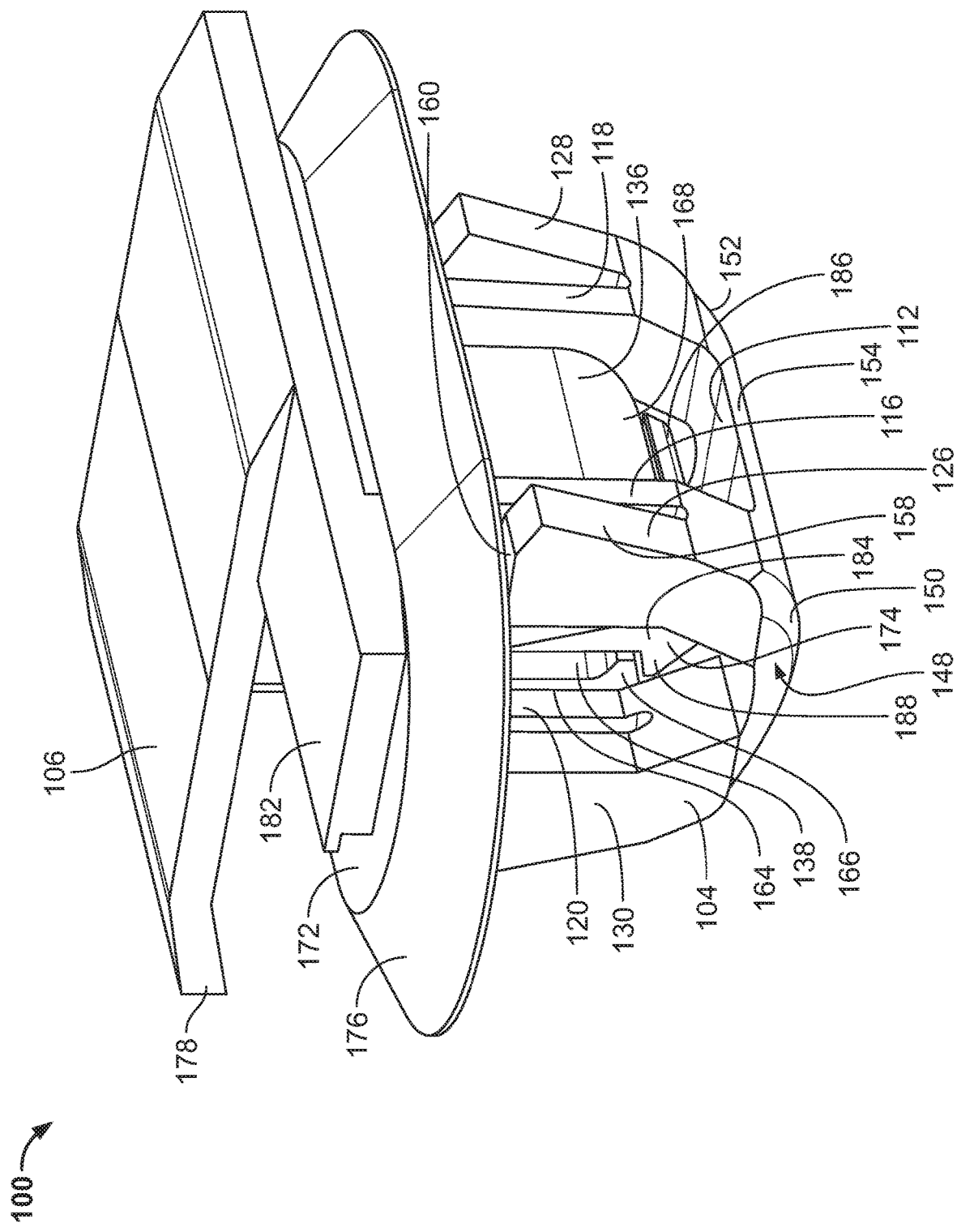
FIG. 1 is an isometric view of a first example fastener according to an embodiment of the disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide a fastener that firmly secures into a first panel, is simple to install, and permits relatively easy separation of a second panel from the first panel.

A first example fastener 100 according to an embodiment of the present disclosure is depicted in FIGS. 1, 2, 3, 8, 9, and 10. The fastener 100 includes a grommet 104 and a pin 106.

Figure 3:
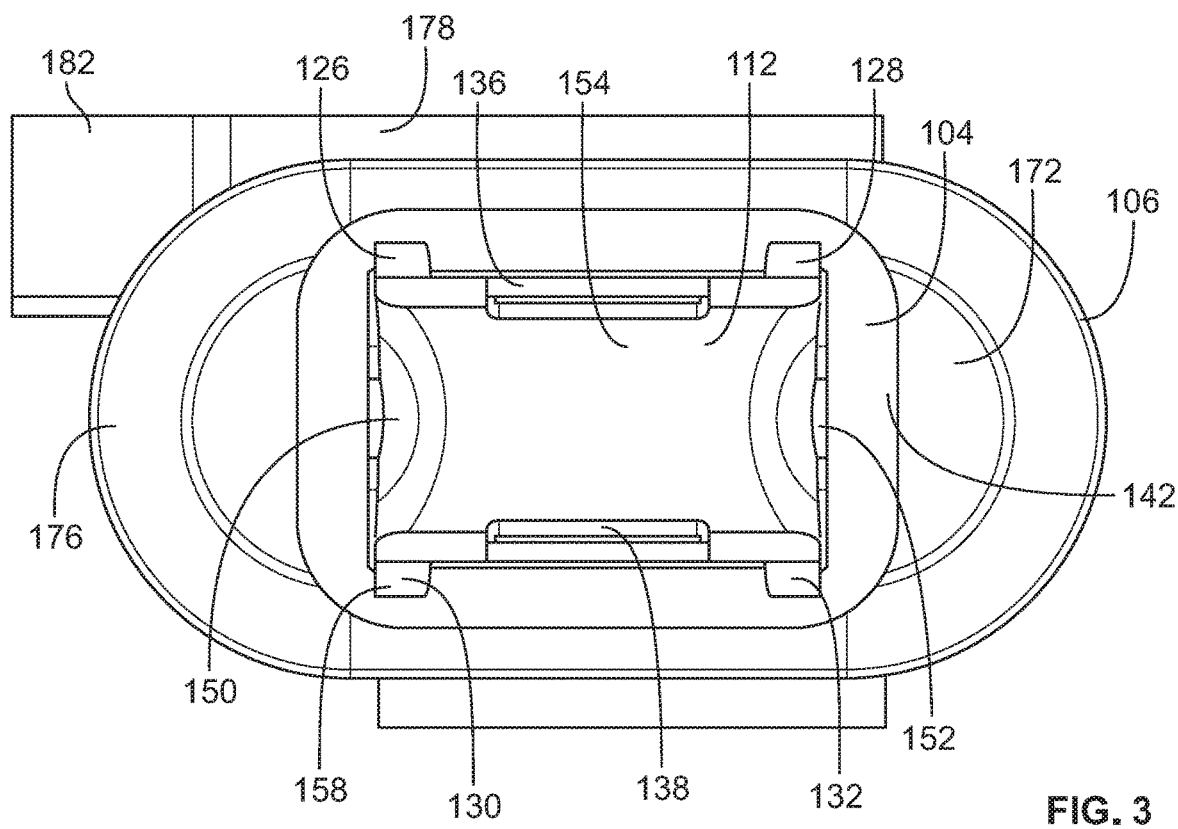
FIG. 3 is a bottom view of the first example fastener of FIGS. 1 and 2.
Figure 5:
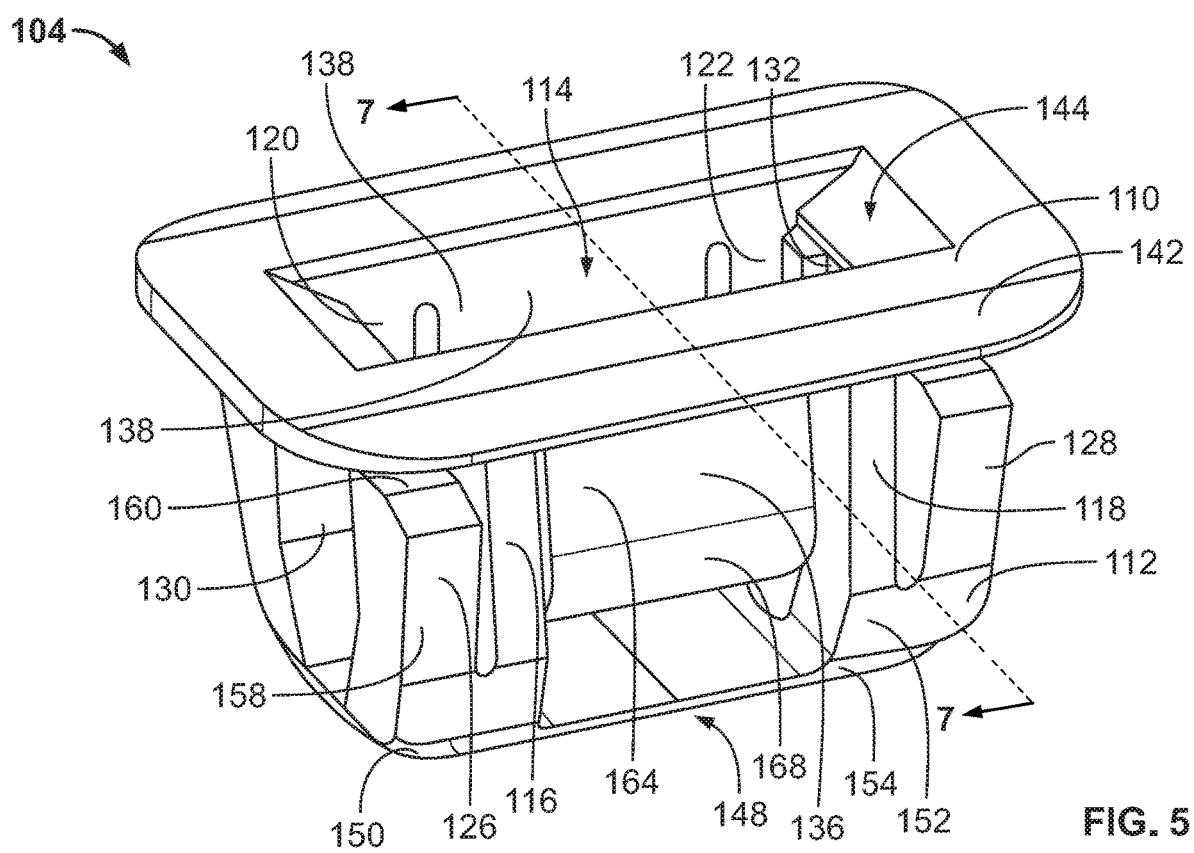
FIG. 5 is an isometric view of a grommet of the first example fastener of FIGS. 1, 2, and 3.

With reference to FIG. 5, the grommet 104 includes a top plate 110 and a bottom plate 112. The top plate 110 defines an opening 114. The grommet 104 further includes a first connector 116, a second connector 118, a third connector 120, and a fourth connector 122. The grommet 104 also has a first prong 126, a second prong 128, and a third prong 130. With reference to FIG. 3, the grommet 104 also includes a fourth prong 132. The grommet 104 additionally includes a first retention finger 136, a second retention finger 138, and a flange 142.

With reference to FIG. 5, the top plate 110 is opposite the bottom plate 112. The first connector 116, the second connector 118, the third connector 120, and the fourth connector 122 connect the top plate 110 to the bottom plate 112. The first connector 116 and the second connector 118 are opposite the third connector 120 and the fourth connector 122.

With reference to FIG. 5, the first prong 126, the second prong 128, the third prong 130, and the fourth prong 132 are resiliently pivotably connected to and extend from the bottom plate 112 toward the top plate 110. The first prong 126 and the second prong 128 are opposite the third prong 130 and the fourth prong 132. The first prong 126, the second prong 128, the third prong 130, and the fourth prong 132 are outboard of the first connector 116, the second connector 118, the third connector 120, and the fourth connector 122. In other words, the first connector 116, the second connector 118, the third connector 120, and the fourth connector 122 are between the first prong 126, the second prong 128, the third prong 130, and the fourth prong 132.

With reference to FIG. 5, the first retention finger 136 and the second retention finger 138 are resiliently pivotably connected to and extend from the top plate 110 toward the bottom plate 112. The first retention finger 136 is opposite the second retention finger 138. The first retention finger 136 is inboard of the first connector 116 and the second connector 118. The second retention finger 138 is inboard of the third connector 120 and the fourth connector 122. In other words, the first retention finger 136 is between the first connector 116 and the second connector 118. Further, the second retention finger 138 is between the third connector 120 and the fourth connector 122.

With reference to FIG. 5, the flange 142 is connected to and extends outwardly from the top plate 110. The flange 142 is generally perpendicular to the first connector 116, the second connector 118, the third connector 120, the fourth connector 122, the first retention finger 136, and the second retention finger 138. The flange 142 is generally parallel to the top plate 110 and the bottom plate 112.

With reference to FIG. 5, the top plate 110 has a top set of lead in features 144. The top set of lead in features 144 may include any type of lead in feature (e.g., chamfers, radii, ramps, etc.). The top set of lead in features 144 surround and at least partially define the opening 114.

Figure 2:
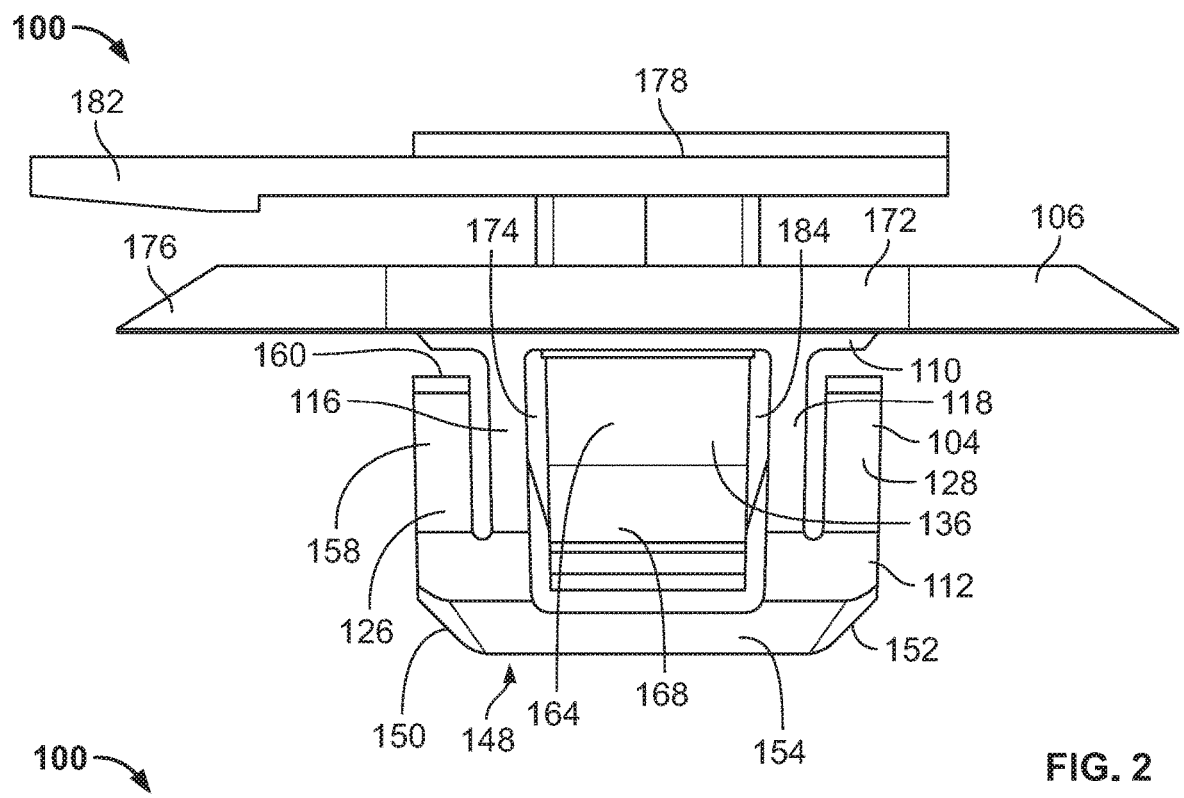
FIG. 2 is a side view of the first example fastener of FIG. 1.

With reference to FIG. 2, the bottom plate 112 includes a bottom set of lead in features 148. The bottom set of lead in features may include any type of lead in feature. In the illustrated example of FIG. 2, the bottom set of lead in features 148 includes a first chamfer 150, a second chamfer 152, and a transverse radius 154. The transverse radius 154 is between the first chamfer 150 and the second chamfer 152. In other words, the bottom plate 112 is rounded via the bottom set of lead in features 148.

Figure 8:
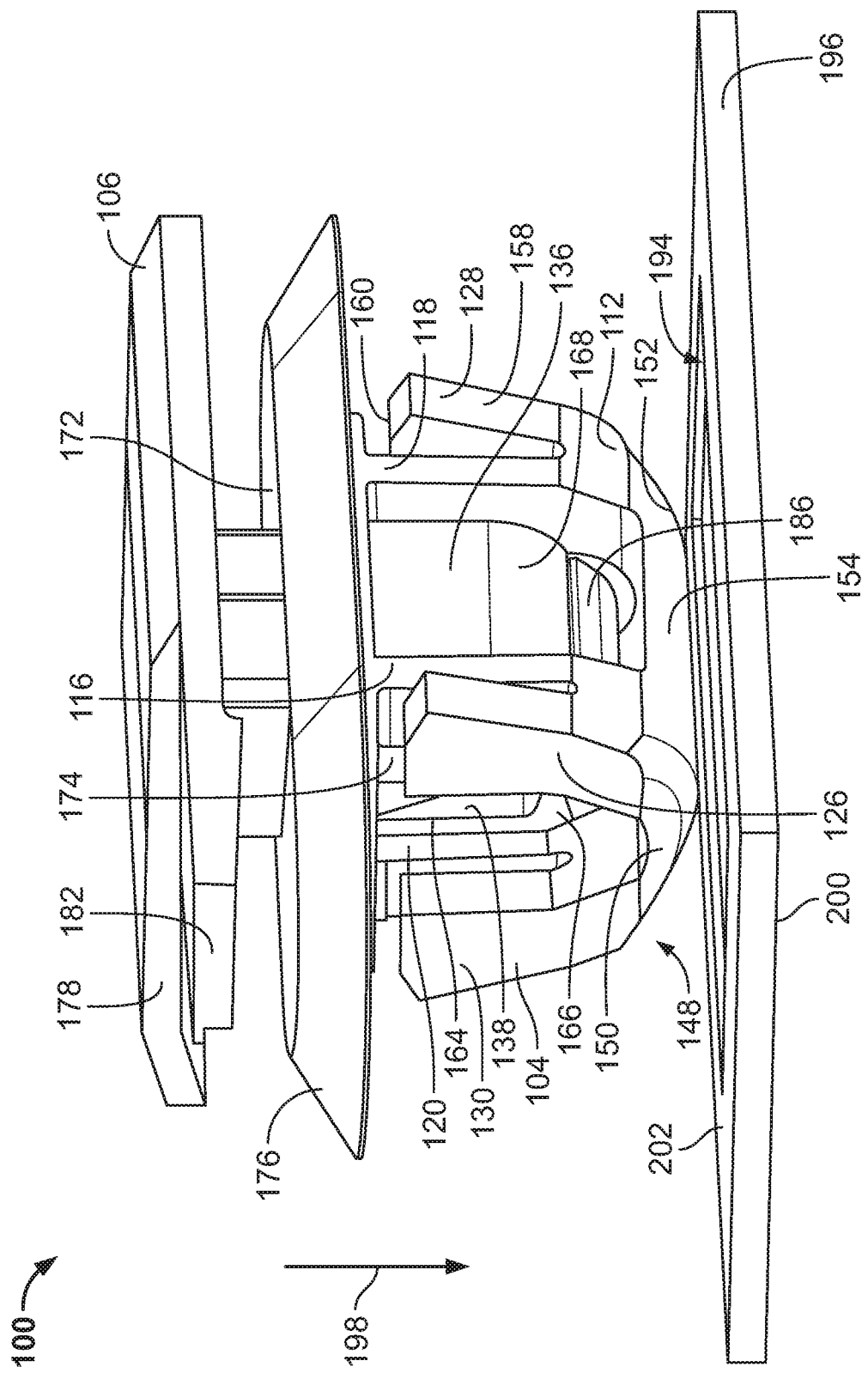
FIG. 8 is an isometric view of the first example fastener of FIGS. 1, 2, and 3 being installed into a panel.

With reference to FIG. 8, each of the first prong 126, the second prong 128, the third prong 130, and the fourth prong 132 (shown in FIG. 3) have a ramp 158 and a top end 160. The ramp 158 progressively widens in width from the bottom plate 112 to the top end 160. In other words, the ramp 158 is tapered to be narrower nearer the bottom plate 112 than the top end 160.

Figure 7:
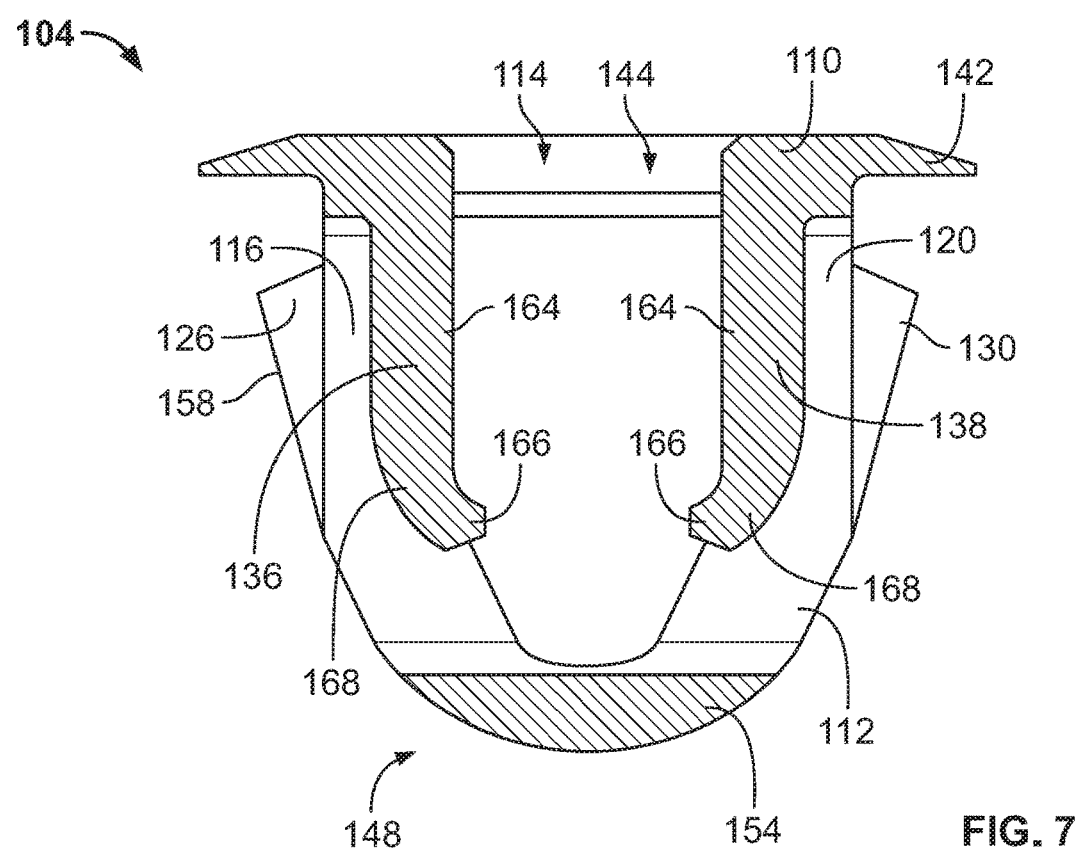
FIG. 7 is a cross sectional view of the grommet of FIG. 5, taken along line 7-7 of FIG. 5.

With reference to FIG. 7, each of the first retention finger 136 and the second retention finger 138 include a resilient portion 164 and a catch 166. The resilient portion 164 is resiliently pivotably connected to and extends generally perpendicularly from the top plate 110. The resilient portion 164 is generally parallel with the first connector 116, the second connector 118, the third connector 120, and the fourth connector 122. The catch 166 extends diagonally inboardly from the resilient portion 164. In some embodiments, the catch 166 is rounded. The catch 166 defines an external shoulder 168.

Figure 4:
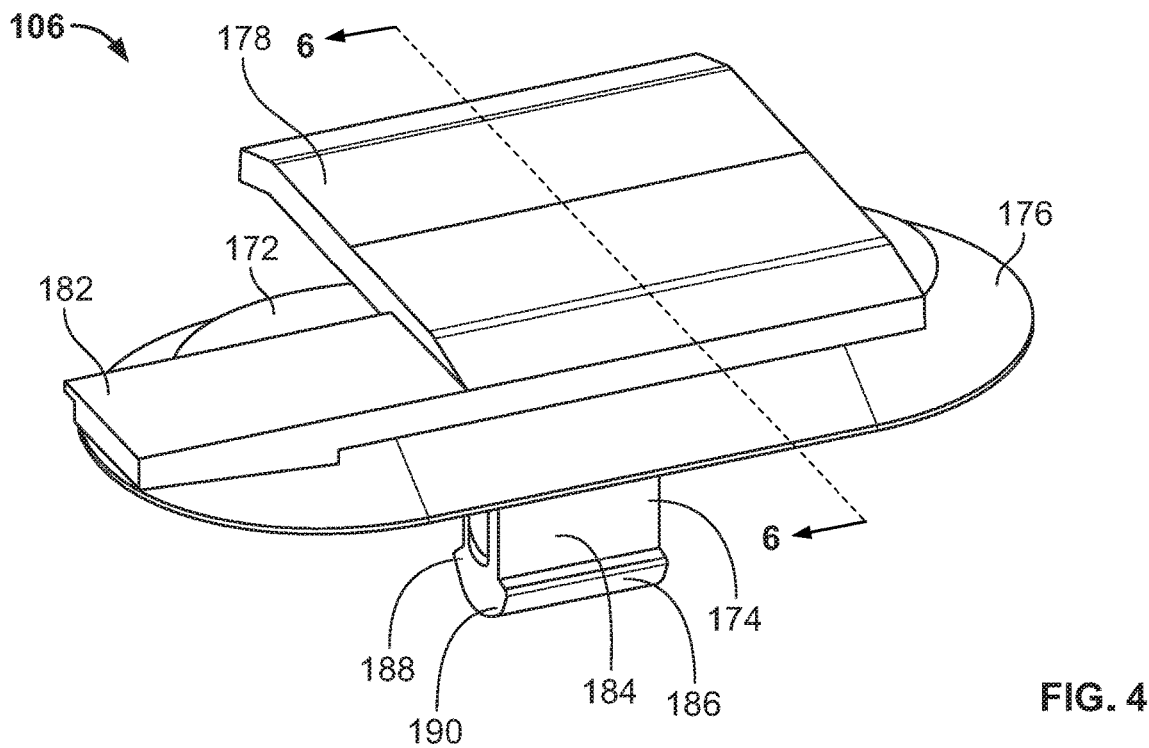
FIG. 4 is an isometric view of a pin of the first example fastener of FIGS. 1, 2, and 3.
Figure 6:
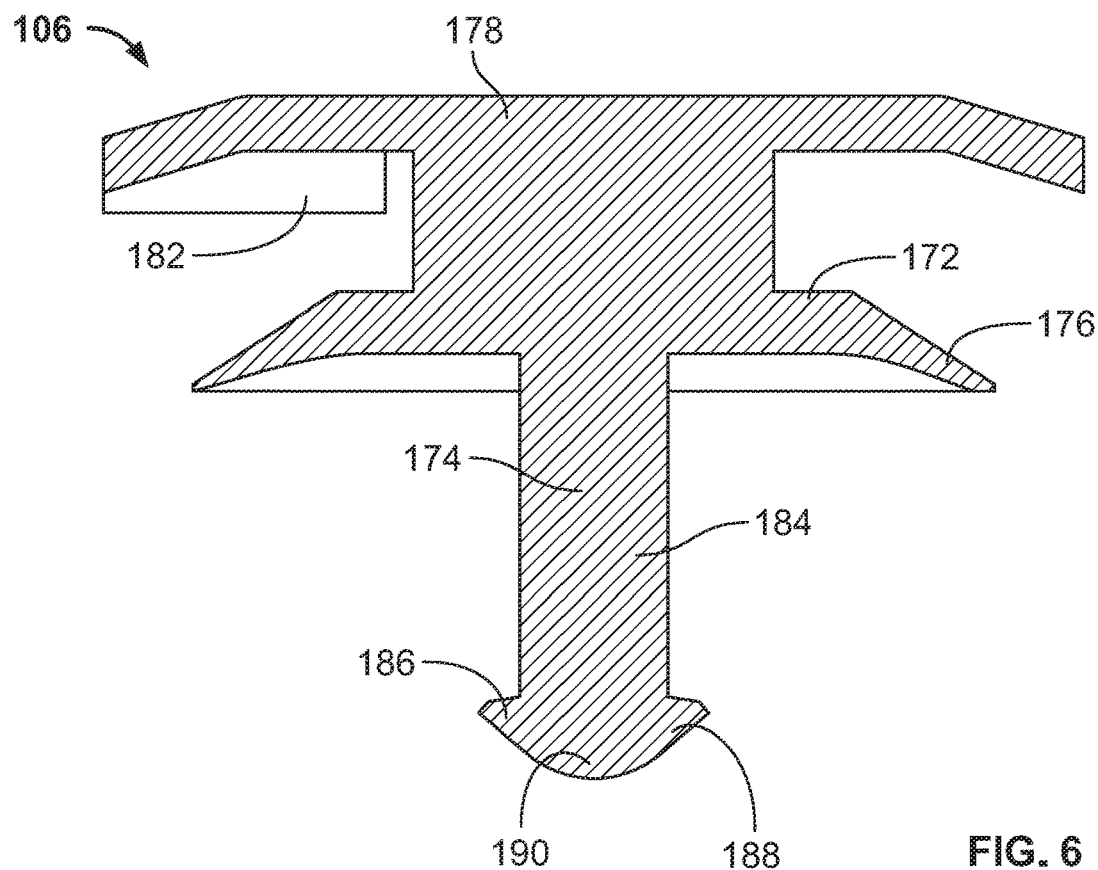
FIG. 6 is a cross sectional view of the pin of FIG. 4, taken along line 6-6 of FIG. 4.

With reference to FIG. 6, the pin 106 includes a plate 172, an insert 174, a flange 176, and a connector portion 178. In some embodiments, the pin 106 also includes a seal (not shown). The insert 174 is connected to and extends generally perpendicularly from the plate 172. The flange 176 is resiliently connected to and extends diagonally outwardly from the plate 172. With reference to FIG. 4, in some embodiments, the flange 176 surrounds the plate 172. Further, in some embodiments, the seal engages and surrounds the flange 176. In some embodiments, the seal is formed of an elastomer. The connector portion 178 is connected to and extends generally perpendicularly from the plate 172. Thus, the plate 172 is between the connector portion 178 and the insert 174. In some embodiments, the connector portion 178 includes a laterally extending retention barb 182.

Figure 10:
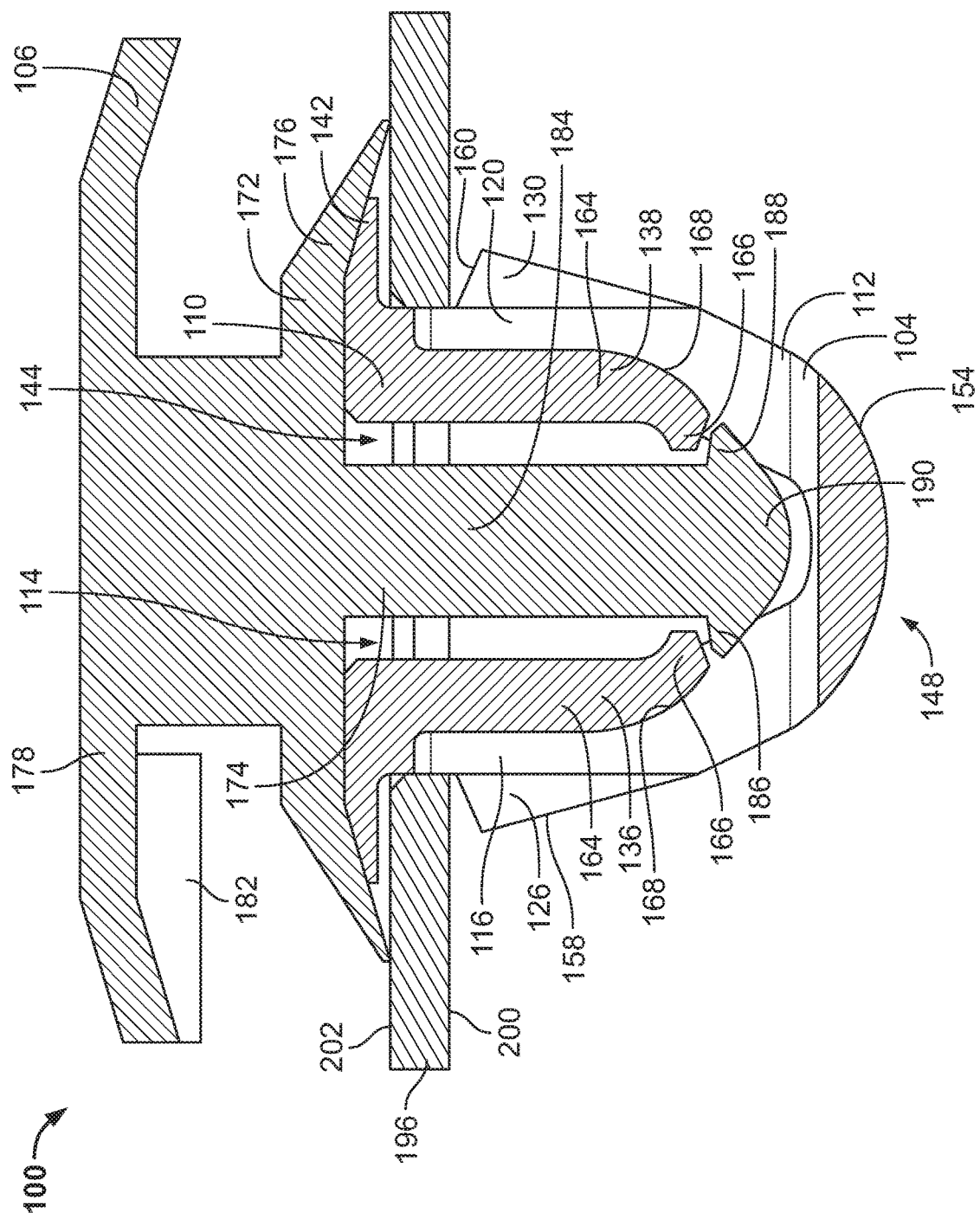
FIG. 10 is a cross sectional view of the first example fastener of FIGS. 1, 2, 3, 8, and 9 installed into the panel of FIGS. 8 and 9, taken along line 10-10 of FIG. 9.

With reference to FIG. 6, the insert 174 includes a stem 184, a first barb 186, and a second barb 188. The stem 184 also includes a lead in feature 190. More specifically, the stem 184 terminates in the lead in feature 190. The lead in feature 190 may be any type of lead in feature. In the example of FIG. 6, the lead in feature 190 is a radius. Thus, in some embodiments, the stem 184 is rounded via the lead in feature 190. The stem 184 is connected to and extends from the plate 172. The first barb 186 and the second barb 188 extend outwardly from the stem 184. The lead in feature 190 is between and transitionally connected to the first barb 186 and the second barb 188. In some embodiments, the first barb 186 and the second barb 188 are rounded. With reference to FIG. 10, the first barb 186 and the second barb 188 are shaped to matingly engage with the catches 166.

With reference to FIG. 10, when the fastener 100 is assembled, the pin 106 is inserted into the grommet 104. As the pin 106 is inserted into the grommet 104, the top set of lead in features 144 and the lead in feature 190 work together to guide the stem 184 into and through the opening 114. As the pin 106 is further inserted into the grommet 104, the first barb 186 and the second barb 188 encounter the catches 166. As the first barb 186 and the second barb 188 push against the catches 166, the first retention finger 136 and the second retention finger 138 resiliently pivot outwardly. When the first barb 186 and the second barb 188 are pushed past the catches 166, the first retention finger 136 and the second retention finger 138 resiliently pivot inwardly to engage the first barb 186 and the second barb 188, respectively. Thus, the pin 106 is snapably engaged with the grommet 104. Further, when the pin 106 is assembled into the grommet 104, the plate 172 engages the top plate 110. Additionally, the flange 176 of the pin 106 engages the flange 142 of the grommet 104. The flange 176 of the pin 106 and the flange 142 of the grommet are shaped to matingly engage one another.

Figure 9:
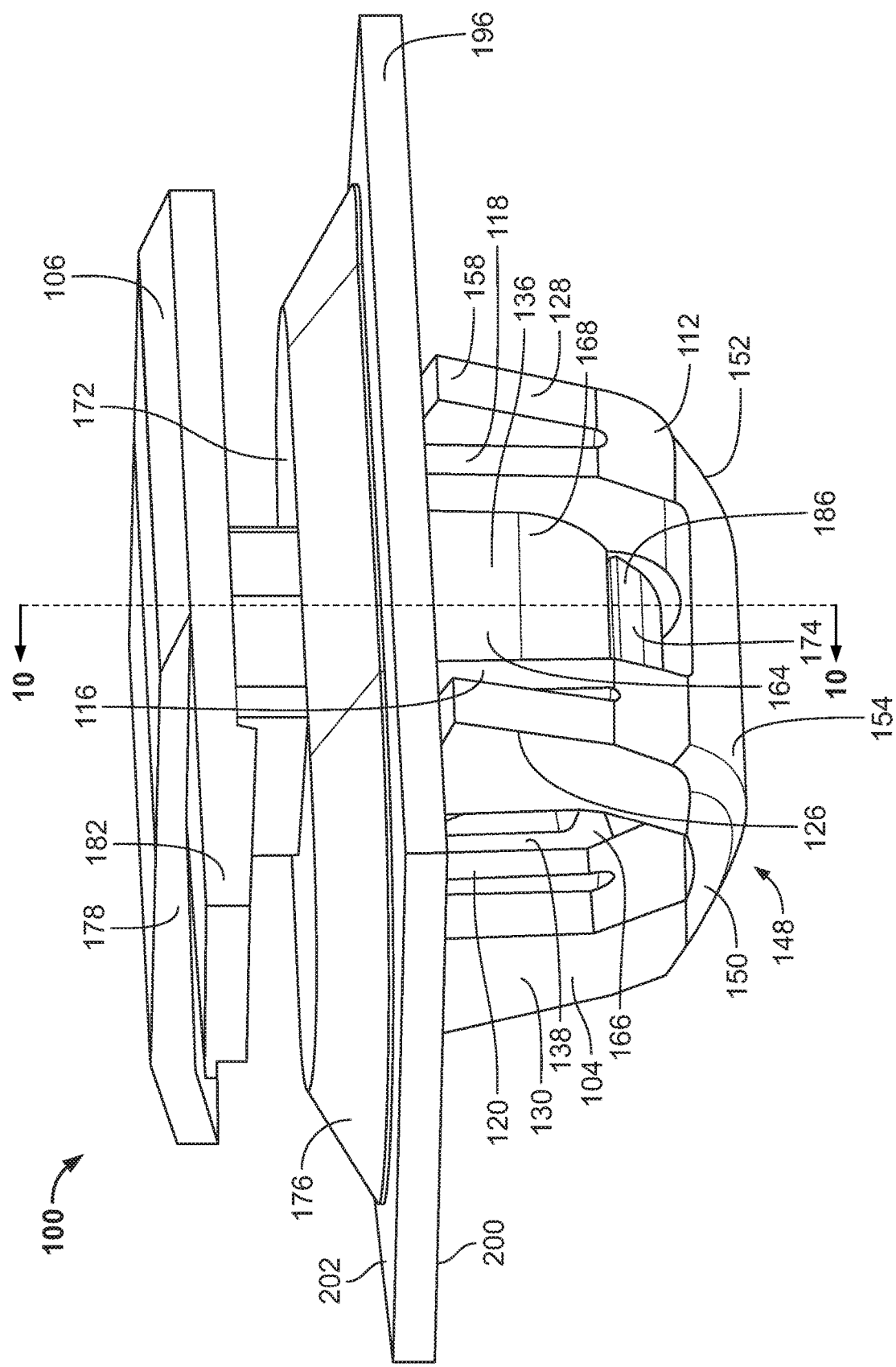
FIG. 9 an isometric view of the first example fastener of FIGS. 1, 2, 3, and 8 installed into the panel of FIG. 8.

With reference to FIG. 8, in operation, in some instances, the assembled fastener 100 is introduced into a slot 194 defined in a panel 196, as indicated by arrow 198. In some instances, the grommet 104 may be introduced into the slot 194 without the pin 106 being assembled into the grommet 104. When the fastener 100 is introduced into the panel 196, the bottom set of lead in features 148 guide the grommet 104 into the slot 194. As the fastener 100 is further pushed into the panel 196, the ramps 158 guide the fastener 100 into the slot 194. As the fastener 100 is further inserted into the panel 196, the first prong 126, the second prong 128, the third prong 130, and the fourth prong 132 (shown in FIG. 3) resiliently pivot inwardly. With reference to FIG. 9, when the first prong 126, the second prong 128, the third prong 130, and the fourth prong 132 are pushed through the slot 194, the first prong 126, the second prong 128, the third prong 130, and the fourth prong 132 resiliently pivot outwardly. Thus, the fastener 100 is snapably engaged with the panel 196.

With reference to FIG. 10, when the fastener 100 is installed into the panel 196, the top ends 160 engage a bottom surface 200 of the panel 196. Additionally, when the fastener 100 is installed into the panel 196, the flange 176 engages a top surface 202 of the panel 196. Thus, because the flange 176 is resiliently pivotably engaged with the plate 172, the flange 176 urges the pin 106 away from the top surface 202 to pull the first barb 186 and the second barb 188 tightly against the catches 166 and the top ends 160 against the bottom surface 200. Additionally, the flange 176 provides a depth guard to prevent the pin 106 from being pushed completely through the panel 196.

With reference to FIG. 11, further in operation, the pin 106 may be extracted from the grommet 104, as indicated by arrow 204. When the pin 106 is pulled away from the grommet 104, the first barb 186 and the second barb 188 encounter the catches 166. Additionally, as the pin 106 is pulled, top ends 160 engage the bottom surface 200. As the pin 106 is further pulled, the first barb 186 and the second barb 188 push against the catches 166 to respectively pivot the first retention finger 136 and the second retention finger 138 outwardly. It should be appreciated that the engagement of the top ends 160 against the bottom surface 200 provides a reaction force to the first barb 186 and the second barb 188 pushing against the catches 166. When the first barb 186 and the second barb 188 are pulled past the catches 166, the pin 106 is freed from the grommet 104 and the first retention finger 136 and the second retention finger 138 resiliently pivot inwardly. In other words, the pin 106 is removably snapably engaged with the grommet 104. It should be understood that the pin 106 may be reintroduced to snapably engage with the grommet 104 when the grommet 104 is seated in the panel 196. It should also be understood that the grommet 104 may be freed from the panel 196 by squeezing the first prong 126, the second prong 128, the third prong 130, and the fourth prong 132 inwardly from the bottom surface 200. Additionally or alternatively, the grommet 104 may be freed from the panel 196 by introducing a tool (e.g., pliers, a pick, an Allen wrench, etc.) through the opening 114 to pull the first prong 126, the second prong 128, the third prong 130, and the fourth prong 132 (shown in FIG. 3) inwardly.

As used herein, panel may refer to any component that may be attached or assembled to another component. Any of the panels described herein may be made of any suitable material, for example, a metal or plastic material.

Embodiments of the present disclosure provide a fastener, and, more particularly, a grommet that securely and removably receives a pin and firmly seat into a panel. In some embodiments, the pin includes a barbed stem and resilient flange. In some embodiments, the grommet includes four prongs, two retention fingers, and has multiple sets of lead in features to guide the grommet into the panel and guide the pin into the grommet.

From the foregoing, it will be appreciated that the above example fastener 100 snapably fits into a panel with four points of contact via the grommet 104 and the pin 106 is removable from the grommet 104. Thus, the fastener 100 seats more securely into the panel than existing pin-and-grommet type fasteners. Further, the pin 106 is more easily repeatedly removable from the grommet 104 than existing pin-and-grommet type fasteners. Thus, the fastener 100 may be reused, fewer fasteners may be damaged during installation and disassembly for service, work stoppages along assembly lines utilizing the fastener 100 may be reduced, and time and energy expended associated with the work stoppage may be reduced. Thus, the above-disclosed fastener 100 conserves resources and energy as compared to existing fasteners.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A fastener, comprising:
  a grommet having a top plate, at least one retention finger resiliently pivotably connected to the top plate, a bottom plate including a bottom set of lead in features, an opening extending through the top plate toward the bottom plate, and at least four tapered prongs resiliently pivotably connected to the bottom plate; and
  a pin configured to removably snapably engage the grommet, the pin having a lead in feature configured to guide the pin into the opening of the grommet and one or more barbs that, when the pin is inserted into the opening of the grommet, causes the at least one retention finger to move outwardly until a catch of the retention finger snapably engages the barb of the pin.

2. The fastener of claim 1, wherein at least one of the prongs includes a ramp extending to a top end of the prong, the top end being disposed adjacent to the top plate.

3. The fastener of claim 1, wherein the grommet includes a top set of lead in features configured to guide the pin into the opening of the grommet.

4. The fastener of claim 3, wherein the top set of lead in features of the grommet includes at least one chamfer.

5. The fastener of claim 1, wherein the lead in feature of the pin is a radius arranged below the one or more barbs.

6. The fastener of claim 1, wherein the grommet has a plurality of retention fingers, and
  wherein the pin has a plurality of barbs that removably snapably engage the catch of each of the plurality of retention fingers.

7. The fastener of claim 6, wherein at least one of the plurality of retention fingers includes a resilient portion extending from the top plate, the catch being arranged at an end of the resilient portion such that the catch is disposed closer to the bottom plate than the top plate.

8. The fastener of claim 7, wherein the catch extends inwardly relative to the resilient portion toward the opening of the grommet.

9. The fastener of claim 5, wherein the pin has a plurality of barbs, and
  wherein the radius of the pin is a transverse radius extending between the plurality of barbs.

10. The fastener of claim 1, wherein the grommet further includes at least four connectors connected to the top and bottom plates, the at least four connectors being arranged between the opening and each of the at least four prongs.

11. The fastener of claim 1, wherein:
the grommet includes a first flange, and
the pin includes a second flange.

12. The fastener of claim 11, wherein the second flange is configured to matingly engage with the first flange.

13. The fastener of claim 1, wherein the pin includes a plate and a flange resiliently pivotably connected to the plate.

14. A fastener, comprising:
a grommet having a top plate, at least one retention finger resiliently pivotably connected to the top plate, a rounded bottom plate, an opening extending through the top plate toward the bottom plate, and a plurality of prongs resiliently pivotably connected to the bottom plate; and
a pin configured to removably engage the grommet, the pin having a connector portion, a stem, and a plate disposed between the connector portion and the stem, the stem having a rounded end configured to guide the stem into the opening of the grommet.

15. The fastener of claim 14, wherein at least one barb extends from the stem that is configured to removably snapably engage the at least one retention finger.

16. A fastener, comprising:
a grommet including:
a top plate;
a bottom plate connected to the top plate and having a bottom set of lead in features;
an opening extending through the top plate toward the bottom plate;
a plurality of tapered prongs resiliently pivotably connected to the bottom plate and extending toward the top plate; and
a plurality of retention fingers resiliently pivotably connected to the top plate and extending toward the bottom plate such that a catch of the retention fingers is disposed closer to the bottom plate than the top plate; and
a pin configured to removably snapably engage the plurality of retention fingers when the pin is inserted into the opening of the grommet.

17. The fastener of claim 16, wherein the top plate has a top set of lead in features.

18. The fastener of claim 14, wherein the plurality of prongs extends toward the top plate.

19. The fastener of claim 14, wherein the bottom plate is rounded via a bottom set of lead in features.

20. The fastener of claim 1, wherein the bottom plate is rounded via the bottom set of lead in features.

21. A grommet for a fastener, the grommet comprising:
a top plate;
a bottom plate;
an opening extending through the top plate toward the bottom plate;
at least four tapered prongs resiliently pivotably connected to the bottom plate and extending toward the top plate;
a plurality of retention fingers resiliently pivotably connected to the top plate and extending toward the bottom plate; and
at least four connectors connected to the top plate and the bottom plate, the at least four connectors being arranged between the opening and each of the at least four prongs.

22. The grommet of claim 21, wherein the bottom plate defines a set of lead in features configured to guide the grommet into a slot of a panel, and
wherein the at least four prongs are configured to snapably engage the slot of the panel.

23. The grommet of claim 21, wherein the prongs are outboard of the connectors relative to the opening and the plurality of retention fingers is inboard of the connectors relative to the opening.

24. The grommet of claim 21, wherein at least one of the prongs defines a ramp extending between the bottom plate and a top end of the prong, the ramp widening from the bottom plate to the top end.

25. The grommet of claim 22, wherein the set of lead in features defined by the bottom plate include:
a first chamfer;
a second chamfer; and
a transverse radius extending between the first chamfer and the second chamfer.

* * * * *